June 30, 1953 E. LEWIS 2,643,637
POULTRY FEEDER
Filed Aug. 18, 1950 4 Sheets-Sheet 1

Inventor:
Elmer Lewis
by his Attorneys
Howson & Howson

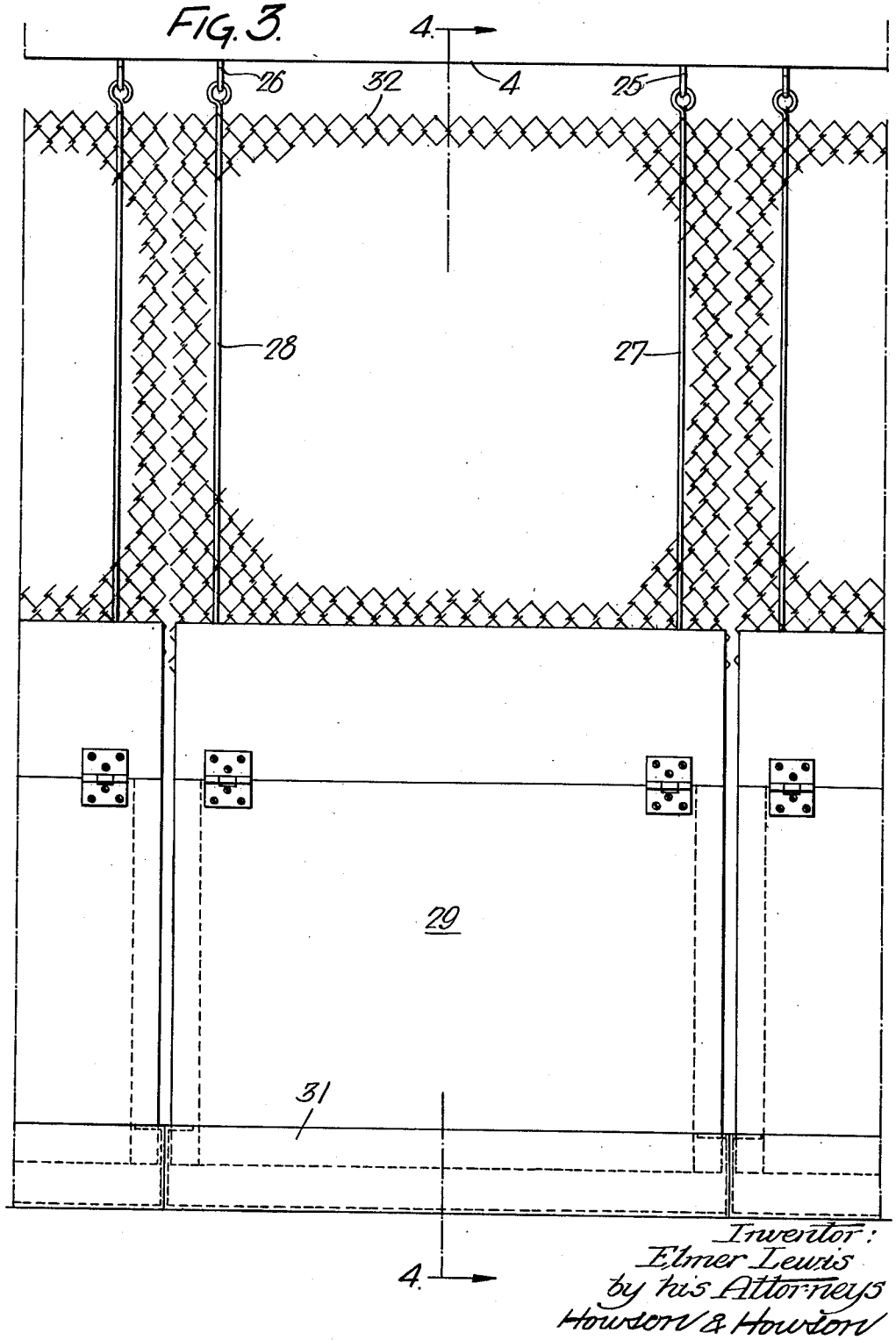

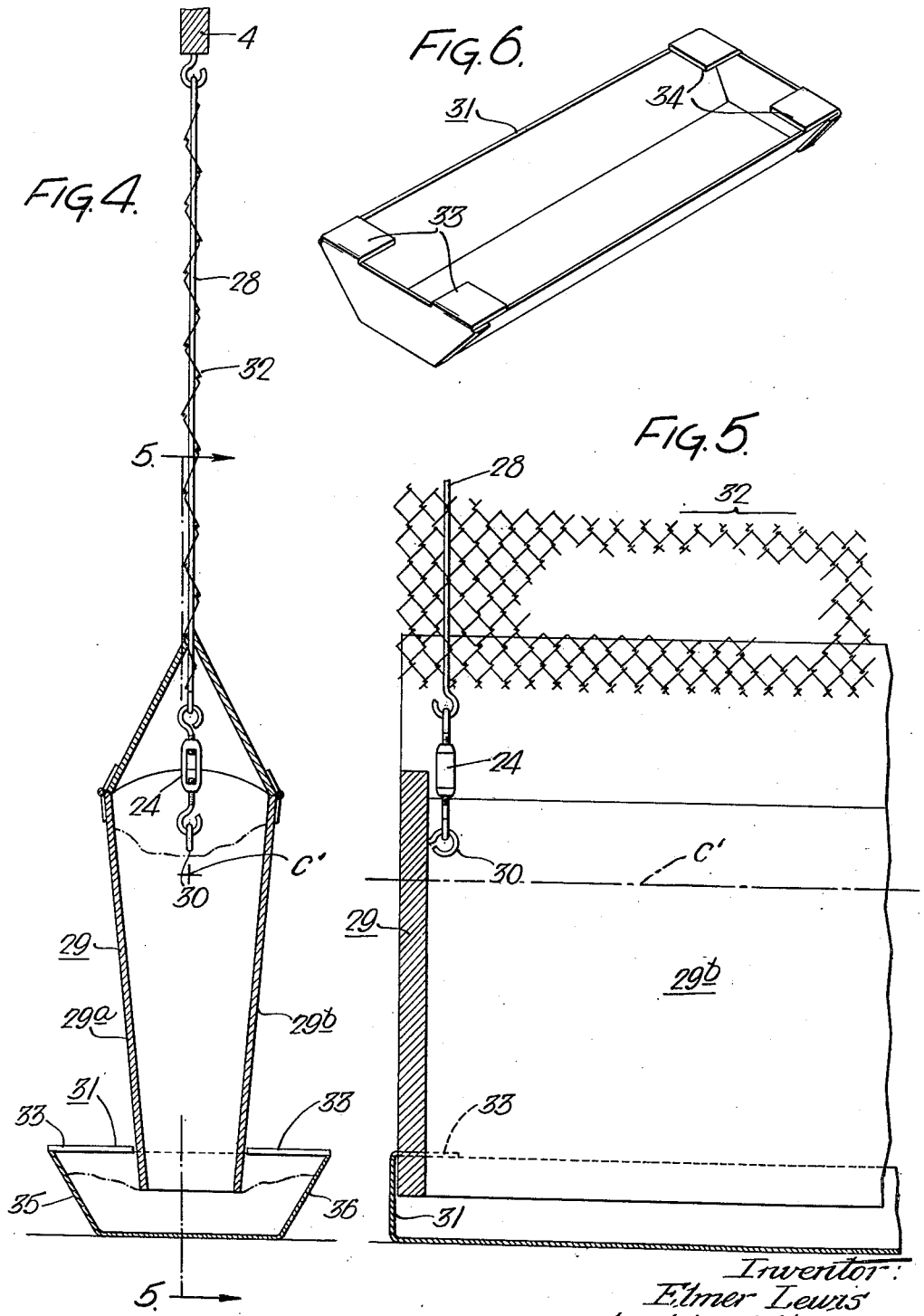

June 30, 1953 E. LEWIS 2,643,637
POULTRY FEEDER
Filed Aug. 18, 1950 4 Sheets-Sheet 4
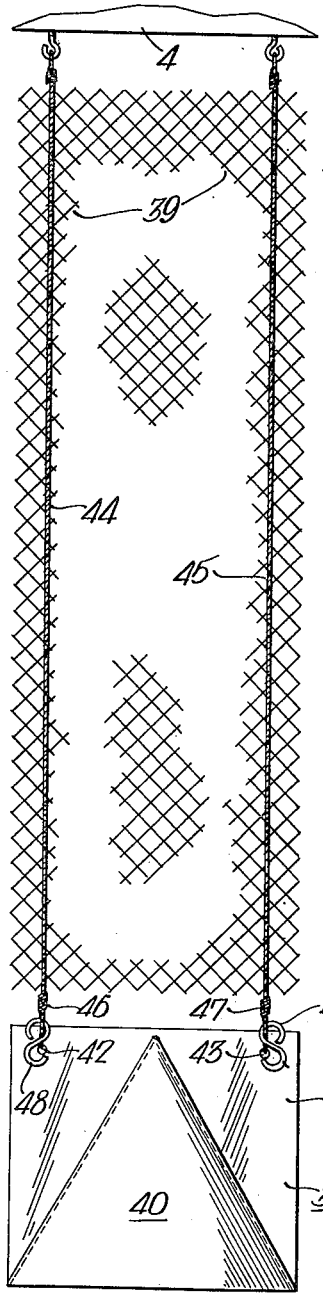
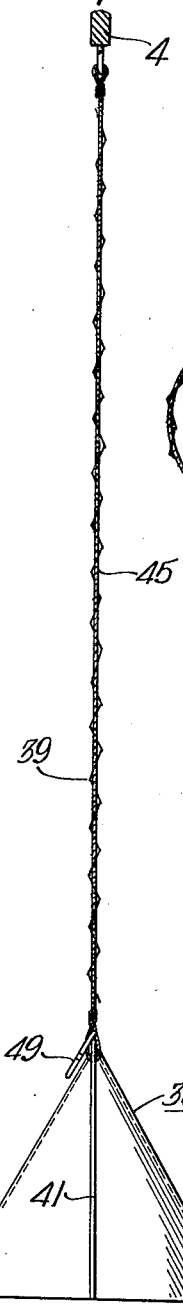
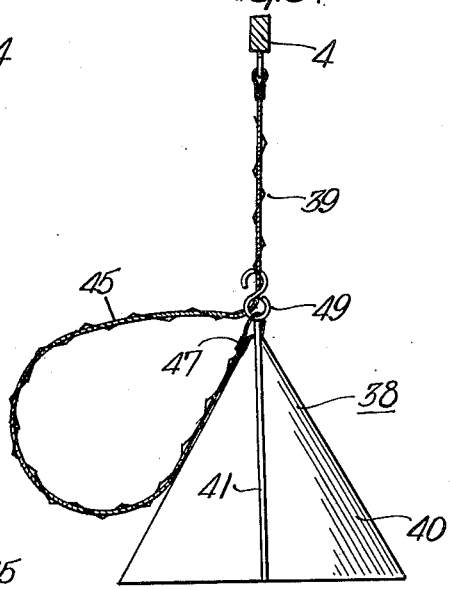
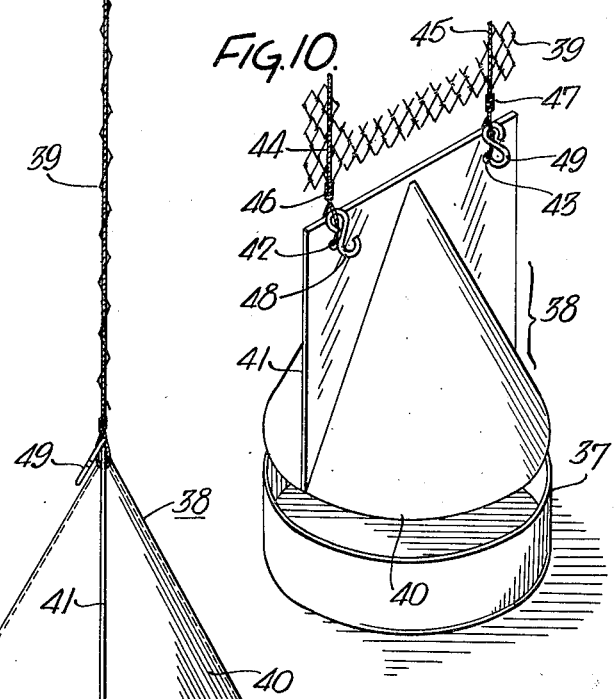
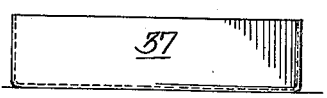
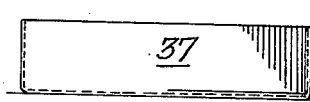
Inventor:
Elmer Lewis
by his Attorneys
Howson & Howson Patented June 30, 1953

2,643,637

UNITED STATES PATENT OFFICE 2,643,637

POULTRY FEEDER

Elmer Lewis, Eustis, Fla.

Application August 18, 1950, Serial No. 180,198

12 Claims. (Cl. 119—21)

The present application is a continuation-in-part of my application of August 31, 1945, Serial Number 613,912 for a Poultry Feeder which matured into Patent No. 2,543,916 dated March 6, 1951.

This invention relates to poultry feeders and the like, and a principal object of the invention is to provide a feeder unit of novel form adaptable for use with similar units in a poultry house to afford an interior arrangement of highly desirable characteristics as hereinafter described.

Another object of the invention is to provide a feeder unit and assembly which will prevent the fowl from roosting above said feeder.

Still another important object is to provide a feeder unit and assembly of the aforesaid character exhibiting a simplified and relatively inexpensive structural form.

To this end the invention contemplates a feeder unit adapted to be supported in principal part by suspension from an available super structure under which the unit may be installed to thereby avoid necessity for including a support structure in the unit itself.

A further object is to provide a feeder unit comprising hopper and trough elements, as hereinafter more fully set forth, wherein the said elements are designed and relatively disposed so as to effectively preclude injury to the feeding fowl.

The invention resides also in certain novel and advantageous structural features hereinafter described and illustrated in the attached drawings wherein:

Fig. 3 is a side elevational view of a modified form of feeder unit showing the unit in alined assembly with similar units;

Fig. 4 is a sectional view on line 4—4 of Fig. 3, illustrating the structural detail;

Fig. 5 is a sectional view on line 5—5 of Fig. 4;

Fig. 6 is a perspective view of one of the elements of the feeder;

Fig. 7 is a side elevational view of another embodiment of my invention in normal position;

Fig. 8 is an end elevational view of the embodiment illustrated in Fig. 7;

Fig. 9 is an end elevation of said embodiment in a raised position; and,

Fig. 10 is a fragmentary perspective view of said embodiment.

Figure 1:
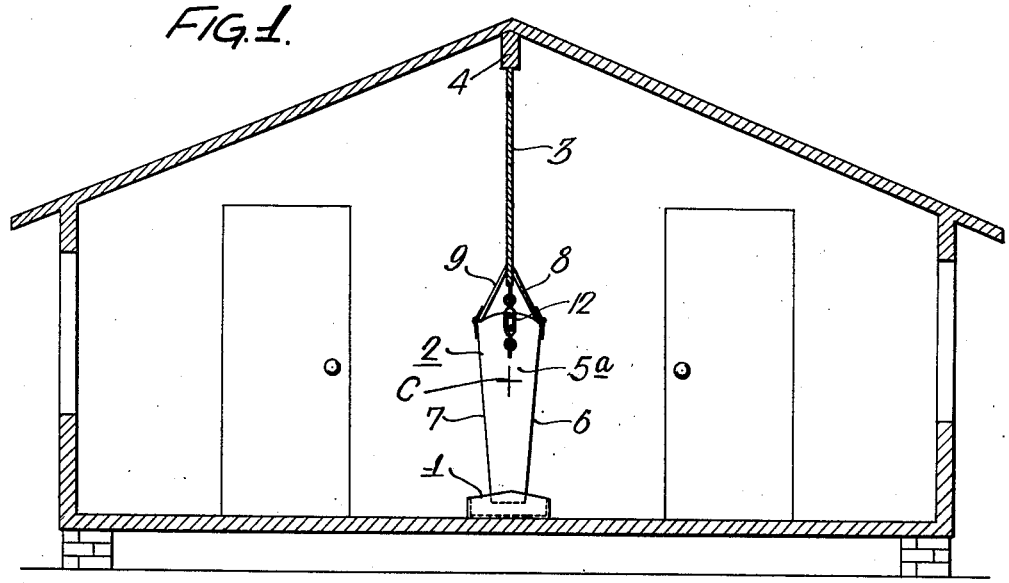
Fig. 1 is a sectional view of a poultry house equipped with a feeder assembly made in accordance with the invention.
Figure 2:
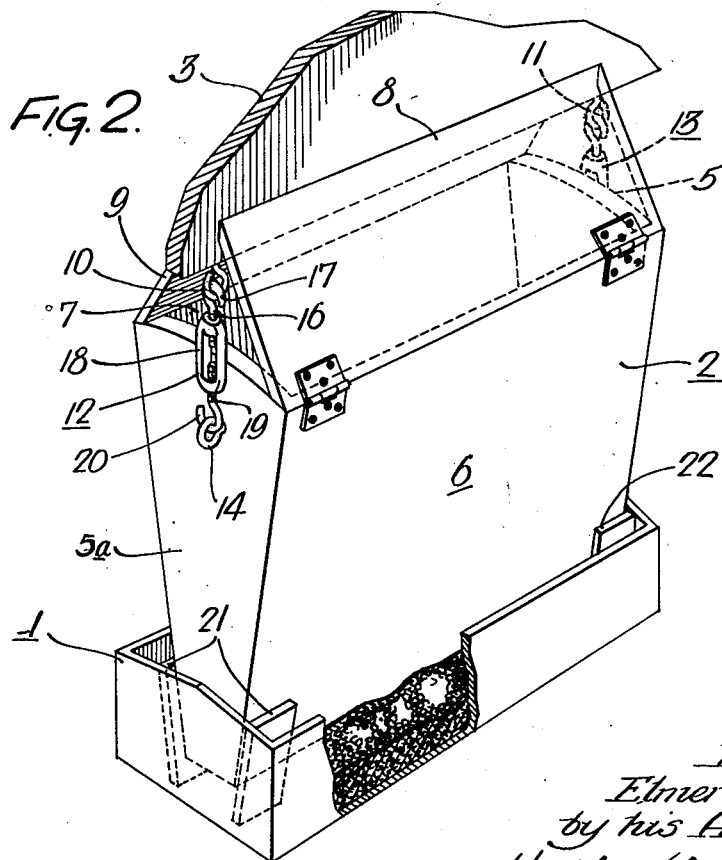
Fig. 2 is an enlarged perspective view of one of the feeder units with a fragment broken away to illustrate the normal position of the feed material.

With reference to the drawings, the embodiment of the invention illustrated in Figs. 1 and 2 comprises a feeder, consisting essentially of a shallow receptacle or a trough base member 1, a feed hopper member 2, and a wall portion 3 constituting partition means suspended from a ridge pole 4 of the superstructure of a poultry pan. The feed hopper 2 consists of end walls 5 and 5a, side walls 6 and 7, and cover elements 8 and 9 hinged to the sidewalls as illustrated. The hopper is suspended from the ridge pole 4 through the medium in the present instance of fixed solid wall portion 3, eyelets 10 and 11, suspension rods 12, 13, an eyelet 14 in the upper part of the end wall 4, and a similar eyelet (not shown) in the opposite end wall of the hopper, the lower end of the hopper being in loose engagement with trough member 1 so as to be normally spaced-apart from the sides of the member 1. The connecting rod 12 is in three sections. The top section 16 is bent to form a hook 17 at one end for engagement with eyelet 10, and is threaded at the other end for engagement with turnbuckle 18 which constitutes the second section of the connecting rod. The bottom section 19 of the said rod is similarly threaded for engagement with the turnbuckle 18 and is formed with a hook 20 for engagement with eyelet 14. Connecting rod 13 is of the same conformation as rod 12.

The mode of operation of the feeder described above is as follows:

The feed material is dumped into the top of the feed hopper opened by the rotation of either cover member 8 or 9 about its hinges. The material tends to flow out from the bottom of the hopper into the trough 1. The quantity of the feed which will enter the trough in the initial feeding operation will be determined by the distance of the lower end of the hopper from the bottom of the trough, said distance being adjustable by manipulation of the turnbuckles of connecting rods 12 and 13. Thus, when the quantity of feed in the trough rises to a point where it entirely closes the space between the lower end of the hopper and the bottom of the trough, the flow of feed from the hopper is automatically interrupted. As the feed is withdrawn by the poultry, additional quantities will pass downwardly from the hopper into the trough to maintain a constant supply in the latter.

Particular attention is directed to the form of hopper which has been formed to possess marked free flowing characteristics and which lacks any pronounced tendency of the feed material to jam between the walls of the hopper in a manner to prevent the free passage of the feed material to the trough. It is to be noted further that the hopper is suspended in a manner which makes it highly susceptible to movement by even light pressures exerted at the lower end, this by reason of the fact that the eyelets 14 and 15 are located above and very slightly displaced from the center of gravity C. It is noted also that the trough has pairs of inward projections or stops, 21 and 22 respectively, at each end positioned in proximity to the side walls of the hopper adjacent to its lower end whereby slight displacement of said end will bring it into contact with said stops. Such movement of the hopper, which may be effected by contact with the lower end thereof of the feeding poultry, and the slight jars occurring as a result of the hopper's contact with the stops will also tend to preclude stoppage by the jamming of the normal flow of feed material to the trough.

It will be noted further that in a poultry feeder of this construction, with the cover members 8 and 9 in closed position to form the upper face of the hopper as illustrated, the poultry are prevented from roosting atop or above said feeder whereby it may be maintained in a clean, dirt-free condition and with the feed free from contamination. The covers 8 and 9 also close the spaces between the lower extremity of the partition and the top end of the hopper member.

A modified form of feeder involving the same principles as that described above is illustrated in Figs. 3 to 6 inclusive. In this case the hopper member 29 is suspended from the ridge pole 4 of the pen superstructure through the medium of hooks 25 and 26; elongated tension elements, in the present instance, rods 27 and 28; connecting rods 23 and 24; and eyelets at the opposite ends of the hopper (of which one is shown at 30) into loose engagement at its lower end with a shallow receptacle consisting of a trough base member 31 so as to be normally spaced-apart from the sides of the member 31. In this embodiment of the invention the fixed wall portion 3 in Figs. 1 and 2 has been replaced by wire mesh or any suitable netting 32 held in place by the interlacing of rods 27 and 29 along interstices of said mesh. This modification has the advantage of allowing greater circulation of air and greater visibility when using the feeder as one of a series to form a partition in the poultry house as illustrated in Fig. 3.

A second modification embodied in Figs. 3 to 6 inclusive is the formation of trough member 31. This trough has at its ends pairs of inward projections in the form of inwardly projecting flanges 33 and 34, which lie at opposite sides of the lower portion of the hopper 29 and which limit the lateral displacement of said hopper.

It will be noted that in this form of the invention the eyelet 30, and the corresponding eyelet (not shown) at the opposite end of the hopper, projects inwardly from the upper part of the end walls of the hopper in close proximity to and above the center of gravity C' thereof so that when two or more units are placed end to end as illustrated in Fig. 3, the end walls may lie in close proximity whereby an inexpensive and mobile partition of the poultry house is provided.

The trough 31 is formed with sides 35 and 36 inclined outward at an angle with the vertical greater than the angles of sides 29a and 29b with the vertical. The upward divergence of sides 35 and 36 of the trough and sides 29a and 29b of the hopper respectively avoids losses due to the fowl becoming lodged between the hopper and the trough with the resulting fatal injury.

Another application of the principle of the invention is shown in Figs. 7 to 10 inclusive illustrating a shallow receptacle in the form of a watering pan 37 with cover member 38, wire mesh or like panel 39, and tension elements or suspension members 44 and 45. This watering unit may be inserted between two adjoining poultry feeder units in a partition structure of the character previously described. The watering pan 37, generally cylindrical in shape, constitutes a base member and is covered by cover member 38 whose configuration is that of an inverted cone 40 with guard plate 41 rigidly attached thereto. The guard plate is provided with vertical end faces and is perforated along its upper edge with openings 42 and 43 through which the rope or cable suspension members 44 and 45 are looped and secured at 46 and 47 respectively. Within said loops are inserted hook members 48 and 49 the function of which will be described hereinafter. Cover member 38 is normally suspended in spaced relation above pan 37 at a distance to permit the fowl to insert only its head into the pan. The cables 44 and 45 are threaded into and support the wire mesh 39 so that the latter presents a barrier to the roosting of the poultry atop the watering pan. The edge of the mesh is flush with the vertical end faces of the guide plate, and when abutted against similar units the mesh and plate present a barrier to the passage of the poultry from one side thereof to the other. It should be noted that the upper face of the member 38 is inclined to prevent the poultry from roosting thereon.

To afford ready access to the watering pan for cleaning or removal and to permit passage from one side of the poultry house to the other when the feeding and watering units are assembled in line, the cover member 38 of the watering pan may be raised and hooked into the interstices of the wire mesh 39 with hooks 48 and 49, as illustrated in Fig. 9, and the pan 37 may or may not be moved to permit said passage.

I claim:

1. In a poultry pen having a superstructure, a feeder unit consisting of a portable shallow receptacle constituting a base member for dispensing the feed to the poultry; a second member suspended independently above and in alinement with said base member, the lower end of said second member being spaced from the sides of the receptacle at such a distance to permit the fowl to insert their heads into the feeding receptacle, yet close enough to exclude the entry of any other portions of their body, the upper face of said second member being inclined to prevent the fowl from roosting thereon and being substantially coextensive with the base; suspension means extending vertically from the upper part of the second member to the superstructure of the pen; and partition means in operative association with said suspension means and extending substantially continuously from the top of the second member to the said superstructure to afford with said member an effective division of the space within the pen separating one side of the feeder unit from the other side.

2. A device according to claim 1 wherein the partition means is a solid wall portion and constitutes a functional element of the suspension means.

3. A device according to claim 1 wherein the suspension means includes elongated tension elements constituting also a support for the partition means.

4. A device according to claim 3 wherein a mesh is supported upon said suspension means to form the partition means.

5. A device according to claim 4 wherein the tension elements are flexible, hooks being provided at the lower ends thereof for engagement with the mesh whereby the second member may be raised and held in elevated position by engagement of said hooks with the mesh.

6. In a device according to claim 1 wherein the outer end faces of the second member are vertical and flat and the edge of the partition means is flush with said end faces adapting the unit for arrangement in contiguous end-to-end relation with other like units to form an extended substantially continuous feeder structure.

7. A device according to claim 1 wherein the second member is a feed hopper with a discharge opening at the lower end, and having at the top end displaceable covers for the admittance of feed material to the hopper.

8. In a device according to claim 7 where the cover member in a closed position closes the space between the top end of said second member and the partition means.

9. In a poultry feeder according to claim 8 wherein the means for suspending the hopper includes eyelet members attached above and in close proximity to the center of gravity of the hopper whereby the hopper may oscillate with the eyelet members as pivots.

10. In a poultry feeder according to claim 9 wherein the base member is a trough with inward projections to limit the said oscillations of the hopper to small angular displacements.

11. In a poultry feeder according to claim 10 wherein within the suspension means is incorporated means for adjusting the height of the hopper in relation to the trough.

12. A device according to claim 1 wherein the base member is in the form of a shallow upright cylinder and the second member is a covering element having the conformation of an inverted cone with plates extended vertically outwardly from said cone so as to give the cover element a substantially rectangular outline in the vertical plane.

ELMER LEWIS.

References Cited in the file of this patent

UNITED STATES PATENTS

| Number | Name | Date |
|---|---|---|
| 11,592 | Abbe | Aug. 29, 1854 |
| 486,508 | Scudder | Nov. 22, 1892 |
| 1,527,653 | Katter | Feb. 24, 1925 |
| 1,693,113 | Hampel | Nov. 27, 1928 |
| 1,922,435 | Harris | Aug. 15, 1933 |
| 2,267,883 | Wood | Dec. 30, 1941 |
| 2,429,777 | Smith | Oct. 28, 1947 |
| 2,543,916 | Lewis | Mar. 6, 1951 |
| 2,591,126 | Brick, Jr. | Apr. 1, 1952 |